Oct. 30, 1951  J. E. DAYGER ET AL  2,573,312
COMBINATION OF CARD CONTROLLED MACHINES
Filed July 9, 1949  6 Sheets-Sheet 1

INVENTORS
JONAS E. DAYGER
ORVILLE B. SHAFER
ALVIN E. GRAY
Geoffrey Knight
ATTORNEY

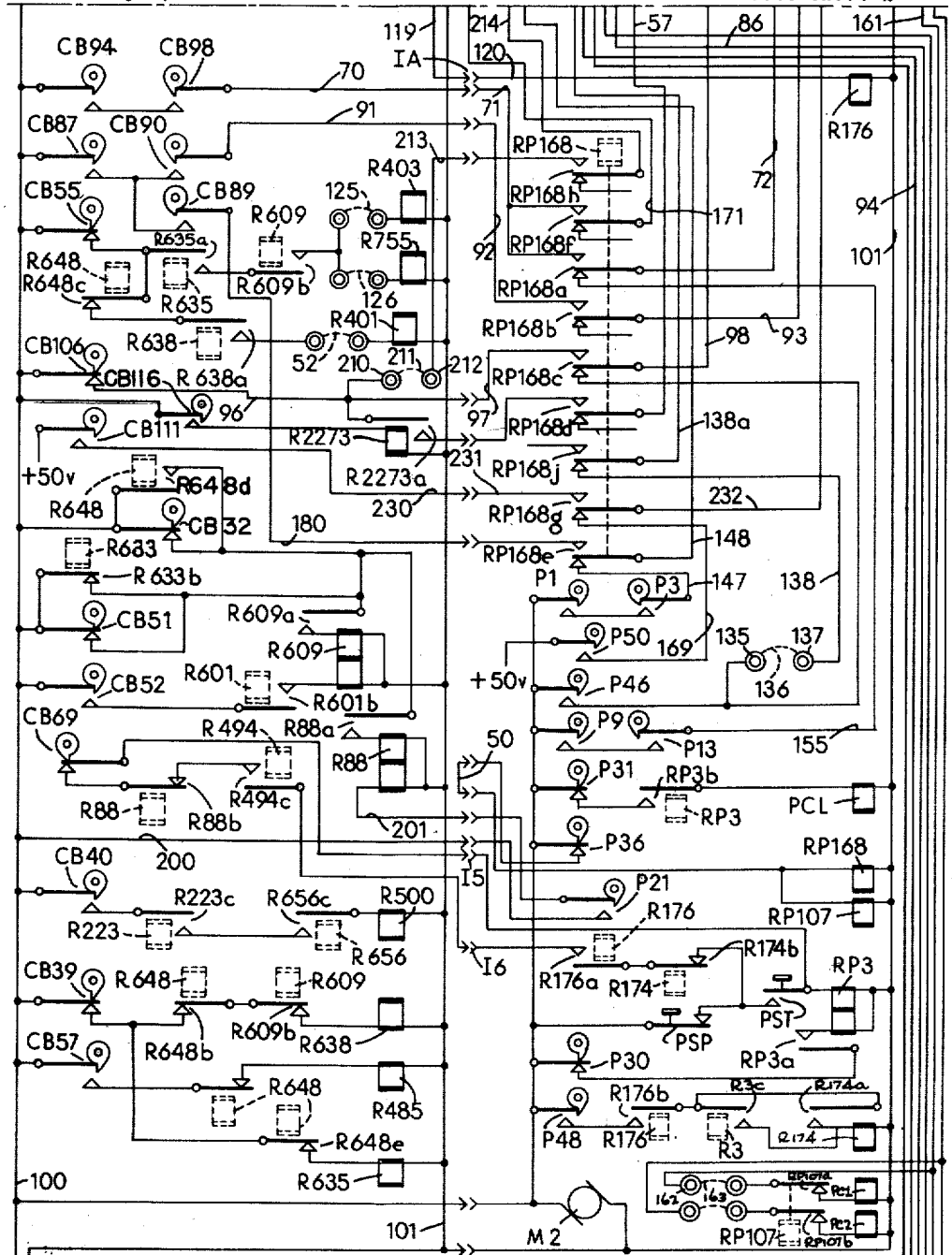

|  | ACCOUNT Nº | HOURS | RATE | EARNINGS |
|---|---|---|---|---|
| CYCLE 1 — CARD FEED<br>  ACCUMULATE EARNINGS<br>  IN CALCULATOR | 29 | 21 | 85 | 17 85 |
| CYCLE 2 — CARD FEED<br>  ACCUMULATE EARNINGS<br>  IN CALCULATOR<br>  SIGNAL SUMMARY PUNCH | 29 | 19 | 95 | 17 95 |
| CYCLE 3 — SUMMARY PUNCH |  |  |  | 35 80 |
| CYCLE 4 — TOTAL |  | 40 |  | 35 80 |
| CYCLE 5 — CARD FEED<br>  ACCUMULATE EARNINGS<br>  IN CALCULATOR | 28 | 20 | 90 | 18 00 |

INVENTORS
JONAS E. DAYGER
ORVILLE B. SHAFER
ALVIN E. GRAY
ATTORNEY

Oct. 30, 1951     J. E. DAYGER ET AL     2,573,312
COMBINATION OF CARD CONTROLLED MACHINES
Filed July 9, 1949     6 Sheets-Sheet 6

INVENTORS
JONAS E. DAYGER
ORVILLE B. SHAFER
ALVIN E. GRAY
Geoffrey Knight
ATTORNEY Patented Oct. 30, 1951

2,573,312

UNITED STATES PATENT OFFICE 2,573,312

COMBINATION OF CARD CONTROLLED MACHINES

Jonas E. Dayger, Binghamton, Orville B. Shafer, Owego, and Alvin E. Gray, Binghamton, N. Y., assignors to International Business Machines Corporation, New York, N. Y., a corporation of New York Application July 9, 1949, Serial No. 103,812

7 Claims. (Cl. 235—61.6)

Record controlled machines of standard types individually perform a certain kind, or limited number of kinds of operations, such as punching, or sorting; or tabulating, listing, and printing totals; or calculating and punching, etc.

There are also large, complex machines composed of a number of different units for performing different kinds of operations, all operating under program instructions from a central control unit.

The larger scope of the complex type of machine has been partially realized by a combination of two electrically interconnected units, such as a high speed summary punch and an electronic calculating machine. In this combination it is necessary to coordinate the timing of the two units, when data is being transmitted from one to the other, and this is done by providing timing means in the punch to operate the calculator, to read data into and out of it.

The general object of the present invention is to improve the scope of operations of machine combinations of the type last described, composed of a plurality of electrically interconnected, approximately standard machines, by combining three or more such machines for integrated operation, without mechanically synchronizing all of the machines.

In accordance with the principle of the invention one of the machines is made the slave of the other machines selectively, under control of record reading means in one or more of the master machines. Each master machine is provided with timing control means to govern the operation of the slave machine, the selection of the particular timing control means to be effective at a given time being accomplished by record controlled means in one or more of the master machines.

A specific object of the invention is to provide a machine group composed of approximately standard machines, which will perform calculations involving multiplication, and print, accumulate, and punch results, under a program controlled by records from which factors are read by one of the machines for calculation.

Other objects of the invention will be pointed out in the following description and claims and illustrated in the accompanying drawings, which disclose, by way of example, the principle of the invention and the best mode, which has been contemplated, of applying that principle.

In the drawing:

Figs. 1A, B, and C are three parts of one circuit diagram of a machine group embodying the invention, the three parts to be assembled in a vertical sequence, as indicated.

Figure 1A:
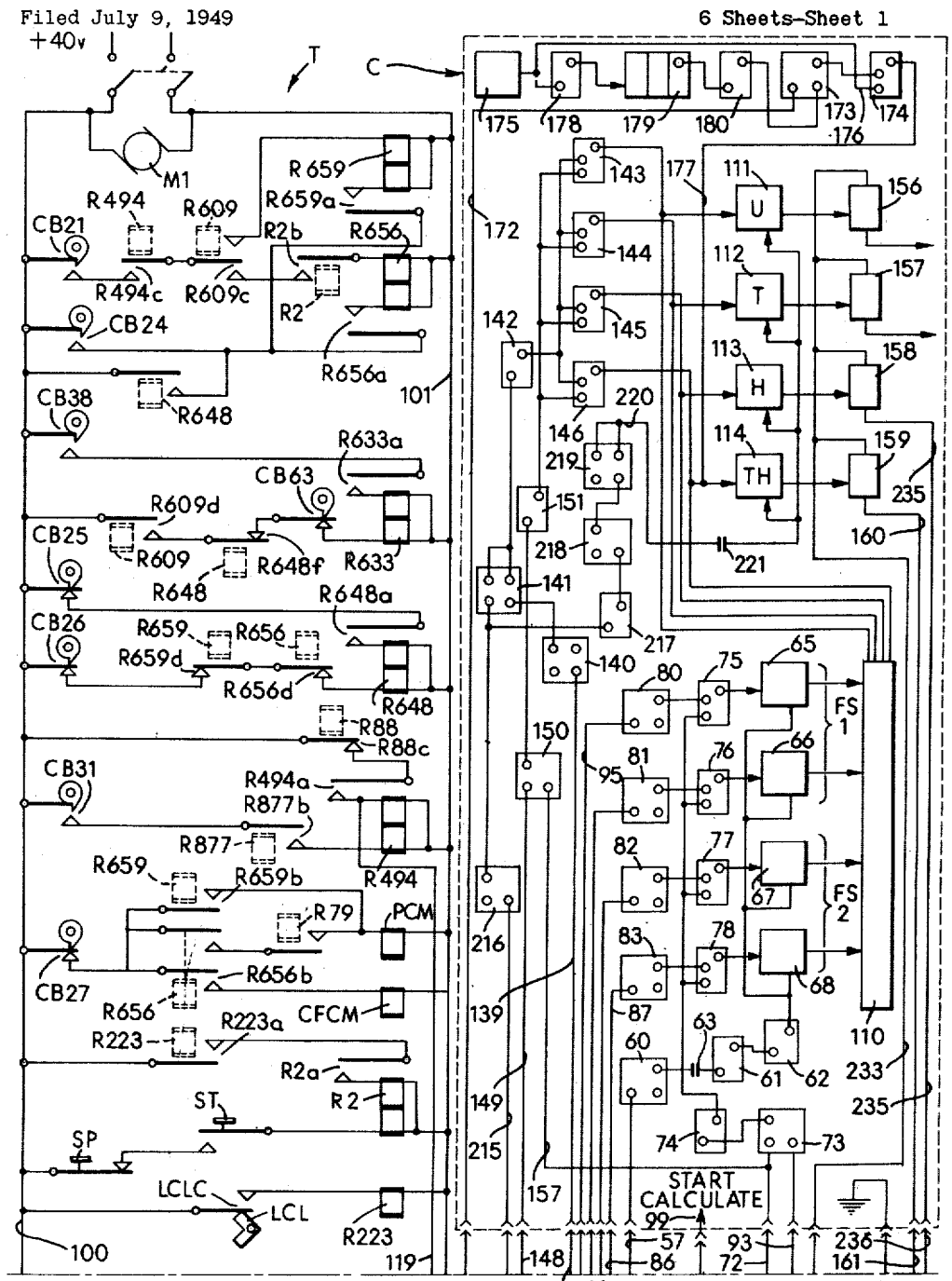
Figure 1C:
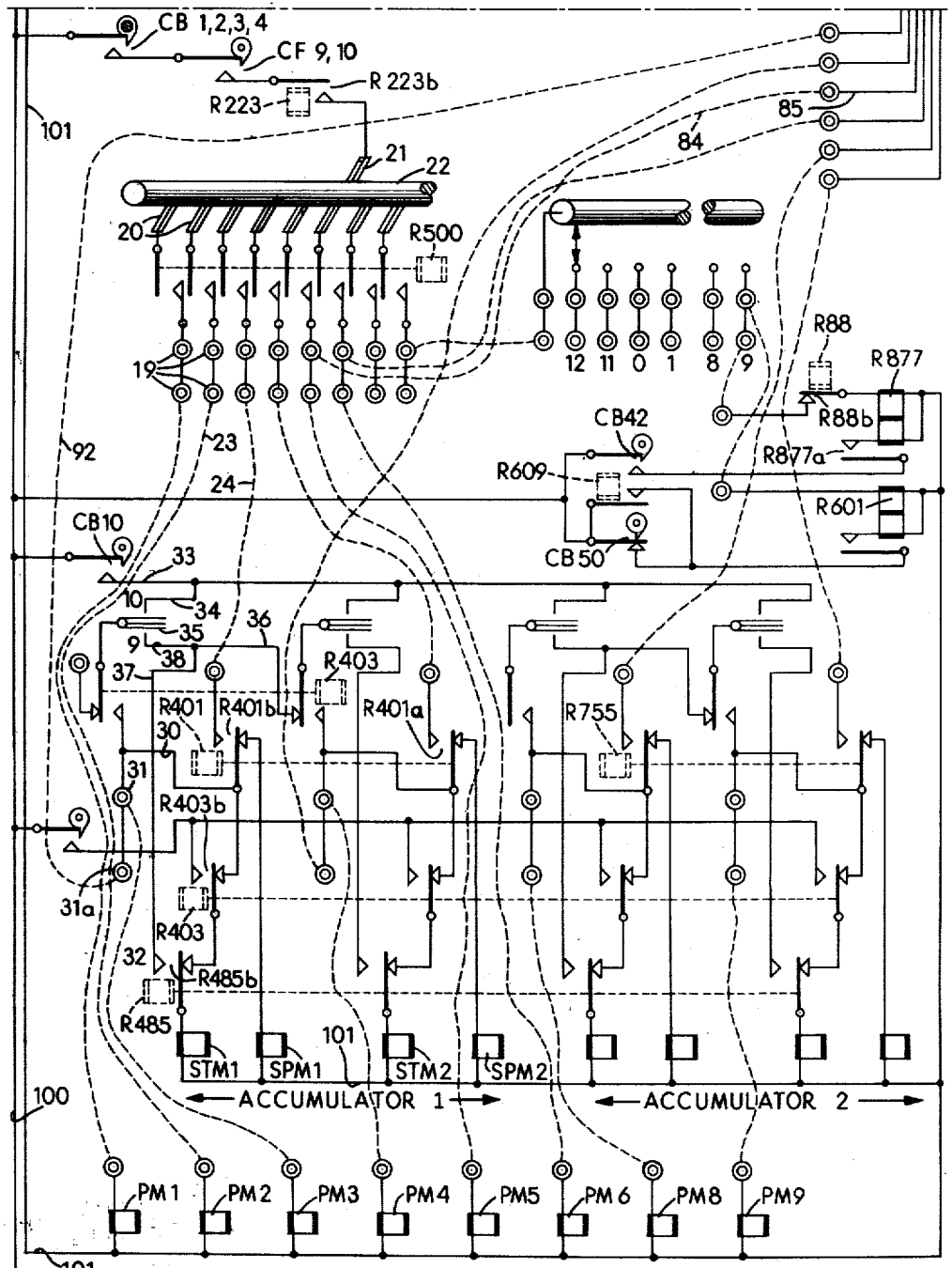

By way of illustration the invention is shown in the drawing as embodied in a combination of three machines which are similar in most respects to three standard machines used in the art of card controlled calculation and accounting work. The machines are, respectively, a tabulating machine T (Figs. 1A, B and C), a summary punch P (Figs. 1A and B), and an electronic calculator C (Fig. 1A).

The tabulating machine

The tabulating machine resembles in mechanical construction a machine shown, for example, in Patent No. 2,340,772. This machine is adapted to feed in sequence, cards of the type shown in Fig. 2, to read coded data from the cards, to accumulate the data in accumulators, to list the individual items of data, and to print totals stored in the accumulators.

The cards are sub-divided into vertical columns and horizontal rows, or index point positions. The vertical columns are grouped into fields and within each field the different columns pertain to different denominational orders. Ten of the index point positions pertain respectively to the ten digits 9, 8, 7, 6, 5, 4, 3, 2, 1, 0, as indicated at the left side of the card, while two higher index point positions, used for control purposes, are designated as the 11 and 12 index point positions. Data is recorded in the cards by punching holes in various index point positions in the different columns. The cards are fed 9's edge first.

In accordance with the invention, the tabulating machine T shown in the drawing is adapted to transfer data from cards read in its card feed, or from any of its accumulators, to the electronic calculator C, and to read out results from the electronic calculator and store them in accumulators and print them, along with the listed items and totals previously mentioned.

For general information on the construction of the tabulating machine and its circuit arrangement, reference is made to the aforesaid Patent No. 2,340,772. The circuit of the tabulating machine shown in the drawing is different in some respects from the one shown in said patent and these differences will be referred to in the course of the following description.

The accumulators of the tabulating machine are composed of number wheels having 10 index positions corresponding to the 10 digits 0 to 9. Each wheel can be clutched to a continuously running gear at differential times, to move it from one index position to another, through a number of index point positions corresponding to the value of a digit to be added. The engagement of the clutch is controlled by a start magnet and the disengagement by mechanical knock-off means acting at the zero time of the machine cycle. Thus, if a hole is sensed in the card at the 6 index point position, the corresponding number wheel will be clutched to its continuously running gear and will be driven through 6 index point positions by the time it is declutched at zero time in the cycle.

The cards are fed in sequence through the card feed of the tabulating machine, their sequential spacing being such that a following card arrives at the same position as the next card ahead of it in exactly one machine cycle. The cycle of this machine is sub-divided into 20 cycle points, ten of which relates to the respective digits 9 to 0. As a card moves along the card feed mechanism it will arrive at a certain time at a reading station called the lower brush station. This reading station comprises a contact roll and a row of brushes bearing on it, one brush for each column of the card. The card passes between the contact roll and the brushes and at various index point times in the cycle the different brushes will sense the punched holes in their respective columns of the card, that is, they will extend through the holes into contact with the contact roll and complete a circuit. According to the wiring of the particular brush and the time in the cycle, the completion of the circuit will produce some function, such as causing one order of an accumulator to add a digit corresponding to the number represented by the punched hole, or setting up a type bar to print that digit, or giving a signal to start the summary punch, etc.

A typical circuit completed through a hole in the card extends from line wire 101 through a circuit breaker CB1, 2, 3, 4 which closes at each digital and control impulse time in the cycle, a circuit breaker CF9, 10 which closes only on card feed cycles during the time when the card is passing under the brushes, a point of relay R223, energized by a card lever when the first card reaches the lower brush station and maintained energized thereafter as long as the cards continue to feed in correct time, a common brush 21, a contact roll 22, a column brush 20, a point of brush isolation relay R500, closed during card feed cycles, a plug hub 19, a plug wire 24, a point of a plus relay R401, energized at this time by control means to be described later, normal contacts of a total relay R403, normal contacts of a carry relay R485, a start magnet STM1, to the other line wire 101. The start magnet is energized and the accumulator wheel is clutched to the continuously running gear, which turns the wheel one digit per cycle point of the machine cycle. At the time the zero index time position of the card reaches the brushes the mechanical knock-off device declutches the accumulator wheel from the continuously running gear.

A little later in the cycle the carry relay R485 is energized by a circuit extending from line wire 100 through CB57, normally closed R648d, relay R485, to line wire 101. At this time an impulse is applied by CB10, wire 33, to all of the so-called tens contacts 34 of the accumulators. If a lower order accumulator wheel has passed from 9 to 0 during the adding time of the cycle, the 9, 10 brush 35 will be lifted into engagement with the tens contact and the above mentioned impulse will be transmitted through these contacts, through a normal contact R403b of total relay R403, wires 36 and 37, a transferred carry relay contact R485b of the next higher order, and the start magnet STM1 of said order, to line 101. The accumulator wheel clutch is engaged and one cycle point later a mechanical knock-off disengages the clutch, with the result that a unit is added by the higher order counting wheel.

In the drawing just two orders are shown in each accumulator, but these are merely representative of a larger number of orders which would generally be grouped together to form one accumulator. If there were a third order in an accumulator and the lowest order had passed from 9 to 0 and the intermediate order stood at 9 when the carry time arrived, the carry impulse from CB10 would be transmitted not only to the start magnet of the intermediate order, but through the 9 contact 38 of that order to the start magnet of the next higher order, so as to perform the carry upon a carry operation required in such a case.

The same card impulse which energized the start magnet and added a digit in an accumulator position can be made to operate a print magnet, to arrest the related type bar in position for printing the digit corresponding to the index point position of the hole sensed. The circuit to the print magnet extends from the operating strap of the plus relay contact R401b, for example, through wire 30, counter exit hub 31, plug wire 32, print magnet PM3, to line 101, energizing the print magnet.

The cards may be grouped according to account numbers. At the end of each group a signal may be given by detecting the difference between the account numbers of the last card of one group and the first card of the next group, to start a total cycle in which the accumulator, that has been adding values from detail cards of the first group, is read out to the printing mechanism and the total printed. During the total cycle the card feed stops and is started again near the end of the total cycle. A total cycle may also be signalled by punching a hole in a certain index position of a particular column of the last card of the group, the brush which reads this column being connected to the control means which starts a total cycle.

*The summary punch*

The summary punch P is similar in construction to one shown in an application of Byron E. Phelps, Serial No. 618,881, filed September 27, 1945. In said application the summary punch has the function of reading record cards to transfer data to an electronic calculator and the function of reading out results from the electronic calculator and punching them in the cards. The use of the summary punch for reading cards is not excluded by the present invention, but only its function of punching results will be described.

In the normal condition of the circuits the summary punch is idle and it operates only when it receives a summary punch signal from the card feed of the tabulating machine. On receiving this signal the summary punch operates the calculator to read a result out of one of its summary punch counters, such as the result counter, and punches the result in a card, while the tabulating machine stands idle.

The summary punch also has means to feed cards in sequence from a hopper through a punching station. The punching station comprises a row of punches, one for each column of the card, and a die. The cards are fed between the row of punches and the die with an intermittent motion, so that the card stops with each index point position in succession located to receive a perforation in any column in which a punch may be operated. The punches are actuated by a common bail, when selectively engaged therewith under control of individual punch magnets.

The punch operates on a 14 point cycle and the cards are fed with the 12's edge leading.

The calculator

Except as will be pointed out hereinafter, the electronic calculating machine is the same in respect to construction and circuit as one shown in the application of R. L. Palmer, James E. Fernekees, J. A. Haddad, Byron E. Phelps, and James V. Williams, Serial No. 38,078, filed July 9, 1948. This calculator receives and stores factors to be operated upon by it, from an outside source, in the present case from the tabulating machine T. The factors are represented by differentially timed impulses which operate various instrumentalities of the calculator. It calculates results in accordance with a program determined by the calculator circuit, and transfers the results to recording means, in response to impulses from the recording means.

Numbers are stored in the calculator in electronic counters. Each order of an electronic counter is a network comprising electronic trigger circuits interconnected in such a way that in response to impulses the network will pass through 10 different conditions and return to its original condition on the tenth impulse. On returning to its original condition it transmits a carry impulse, which causes an impulse to be transmitted to the next higher order counter, during adding operations. During totaling operations the carry impulse is used to operate recording means.

The number stored in the result counters, in the process of calculating the result, is the 9's complement of the true number. That is to say, if the digit stored in one counter position is a 3, the counter position will have received 6 impulses. The counter is read out by impulses from the punch circuit timed with the passage of the index point positions, 0, 1, 2, 3 . . . 9. Thus the fourth impulse, which advances the counter position from 9 to 0 and causes a carry impulse, coincides with the arrival of the 3 index point position of the card at the punch station and causes a 3 hole to be punched.

On reading out the result counter of the calculator into the accumulating and printing mechanism of the tabulator an inversion is necessary, because these mechanisms are adapted to receive their operating impulses in the order 9, 8, 7 . . . 1, 0.

The power supplies of the 3 machines are interconnected so that in the punch and the tabulating machine a potential drop of 40 volts is available across the relays and magnets. Since the punch magnets and counter and print magnets of the tabulator are operated through circuits including thyratrons, which have a 10 volt drop across them, a 50 volt supply wire is provided for these circuits. The calculator also has a variety of positive and negative voltage sources for plate and screen voltage and bias voltages which are not shown in the drawing.

It is a feature of the present invention that the operating impulses for the calculator can be taken either from the tabulating machine or the punch, according to which of these machines is operating in a given cycle. The switching of the impulsing circuit is controlled by relay RP168 in the punch, which is picked up across the wires 100 and 101 through a circuit extending through a shunt connector 50, and a normally closed cam contact P36 of the punch. The shunt connector 50 is a part of the cable connector by which the tabulating machine is connected to the punch, so that relay RP168 is energized immediately when this connector is plugged in. As long as the punch is idle, relay RP168 is energized and its contacts such as RP168a and b are transferred. This has the effect of putting the impulsing circuits of the calculator under control of the tabulating machine, as will be described in detail presently. As soon as the punch starts to run, in response to a signal from the card feed of the tabulating machine, the relay R168 drops and the calculator is under control of the punch.

A relay RP107 is connected in parallel with the relay RP168 and holds open the circuits to the punch magnets by its contacts such as RP107a and b, whenever the punch is idle.

The calculation in the calculator is performed under control of electronic pulse timing means in the calculator, the pulses being at the rate of 50 kilocycles per second. On the other hand, the reading in of factors and reading out of results is performed by the calculator in response to cam-originated impulses from the punch, or from the tabulating machine, occurring at the rate of 1400 to 3000 per minute.

Figures 2, 3:
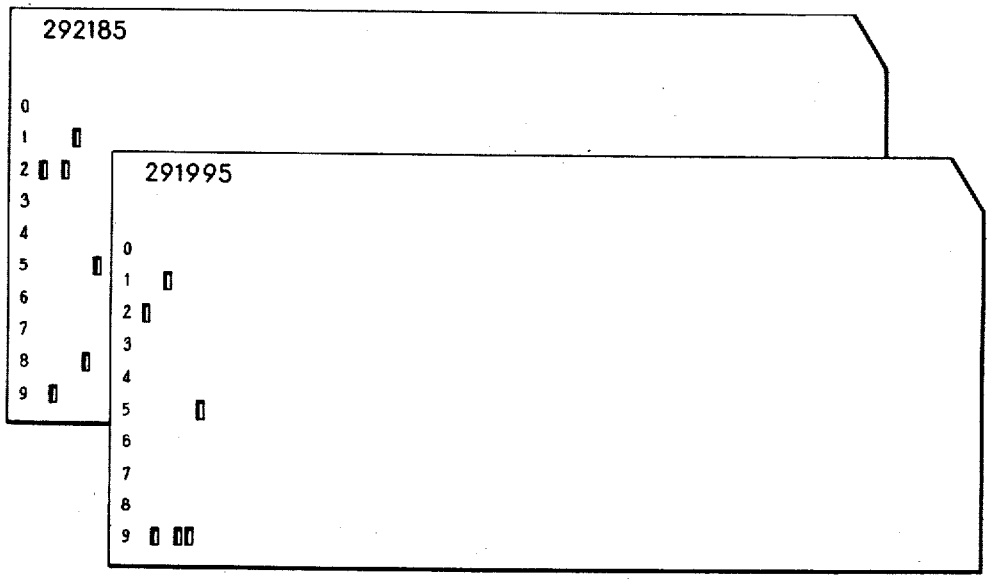
Fig. 2 shows two record cards of the type used to control the machines.
Fig. 3 is a diagram of a sequence of operations of the machine group.
Figure 4:
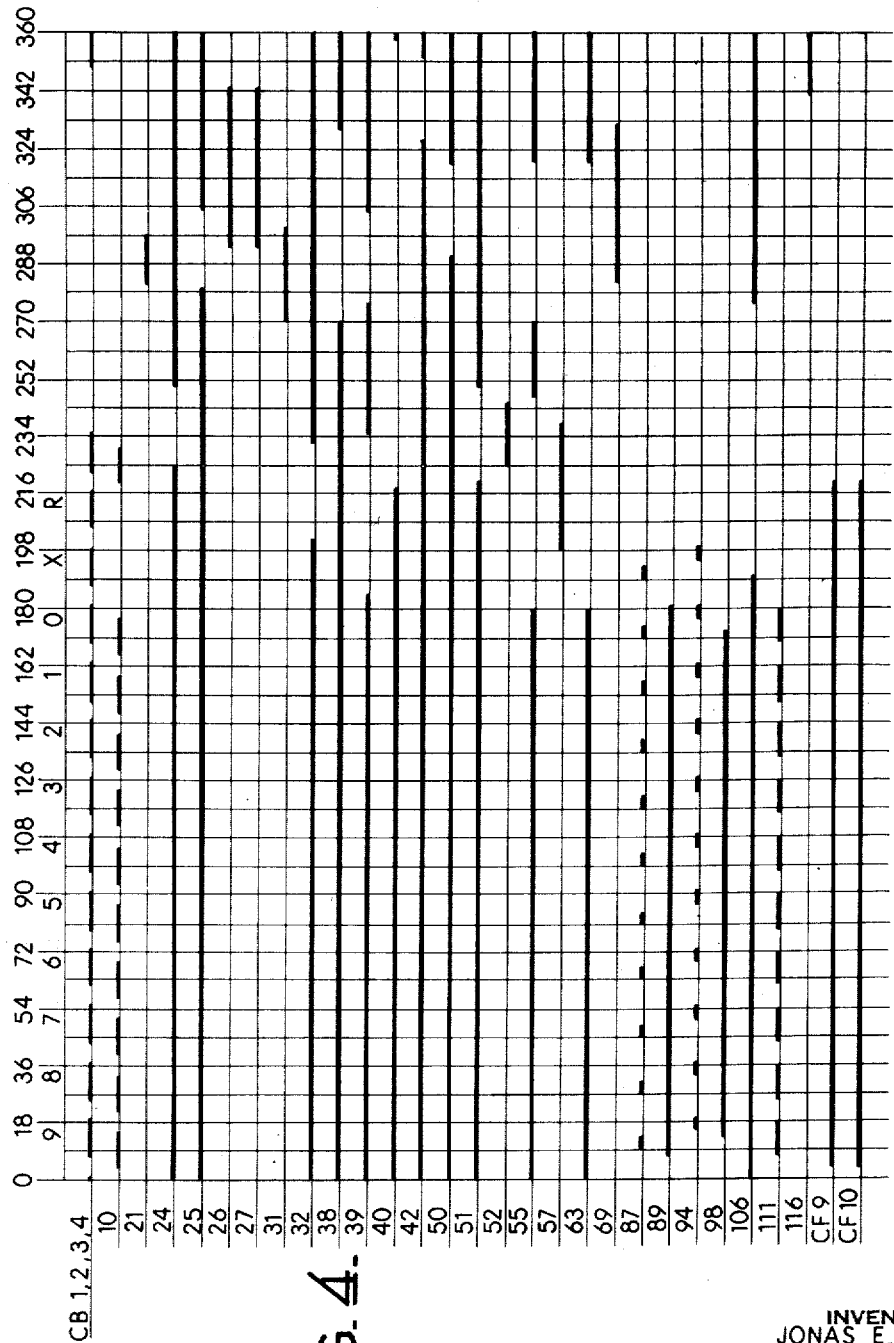
Fig. 4 is a timing diagram of the tabulating machine.
Figure 5:
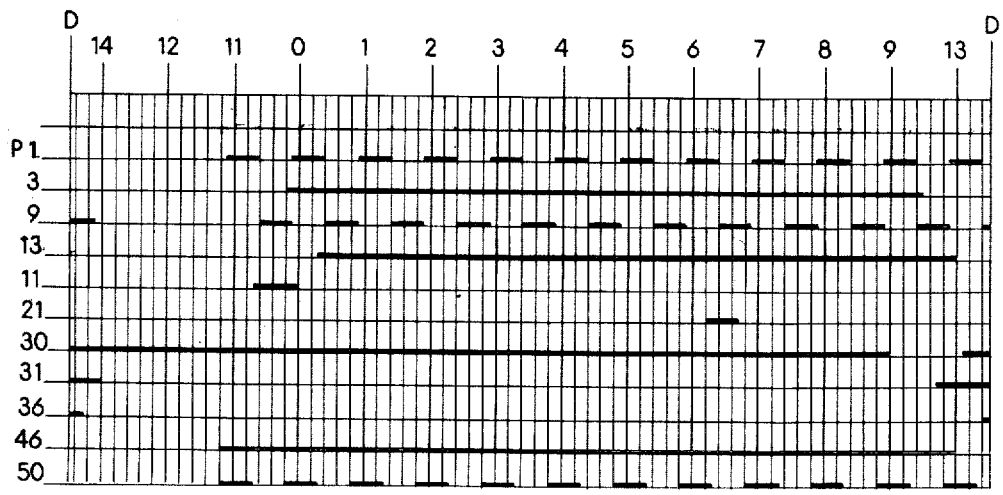
Fig. 5 is a timing diagram of the punch.
Figure 6:
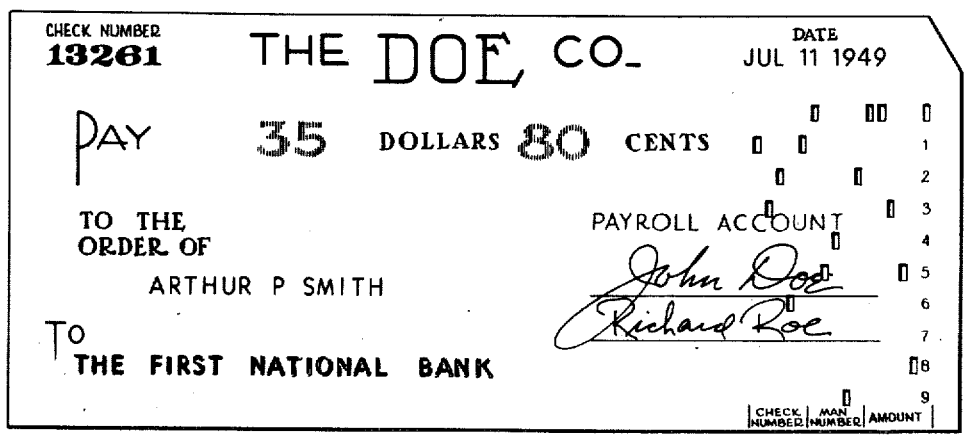
Fig. 6 shows a check such as produced in the punch.

The operation of the combined machines will be most easily understood by following the description of an illustrative problem. While the combination is capable of performing the most complex problems, a relatively simple one will be used to explain its operation. Fig. 3 is a diagram of the making of a payroll report, with summary punching of checks, such as shown in Fig. 6. The report includes four fields of printing. The first receives the account numbers of the employees on the payroll. In the second are listed the hours worked, in the third the rate at which the employee is to be paid. For each account number there may be one or more cards, to be treated as a group. The hours are accumulated in an accumulator, so that their total can be printed at the end of the group listing. The hours and the rate are transmitted to the electronic calculator, by which they are multiplied together and the results accumulated by the result counter of the calculator.

The last card of each group will have a 9-hole punched in column 8 (see Fig. 2), to signal the summary punch to start. The summary punch will operate the calculator to read out the result accumulated in the result counter, without resetting the counter, and will punch that result in a card check (see Fig. 6). During the operation of the summary punch for one cycle the tabulating machine will remain idle. Upon completion of summary punching, it will receive a signal to start and will read out and reset the result counter of the calculator, accumulating the result in one of its registers and printing the result in the fourth field of the report.

The circuit

With the main switch closed, feeding power to the motors M1 and M2 of the tabulating machine and the summary punch, and with a supply of cards in the card feed hoppers of the tabulating machine and the summary punch, the start key PST of the summary punch is operated extending a circuit from line 100 through the contact of the punch stop key PSP, the contact of the punch start key PST, and the pick up coil of relay RP3, to line 101, energizing said relay. A holding circuit for RP3 extends through RP3a and cam contact P30. RP3b completes a circuit from line 100 through P31 and RP3b to the punch clutch magnet PCL and line 101, energizing the punch clutch and setting the punch in operation. The start key is held down for three cycles and allowed to latch up at the end of the third cycle, at which time a first card fed out of the hopper is ready to enter the punch and die station. The punch remains in this condition until called into action on a signal from the tabulating machine, as described later.

Now the start key ST of the tabulating machine is operated, completing a circuit from line 100 through stop key contact SP, start key contact ST, the pick up coil of start relay R2, to line 101, energizing the start relay. At 282° in the tabulating machine cycle a continuously running cam contact CB21 closes, completing a circuit from line 100 through said cam contact, normally closed relay points R494 and R609, contacts R2B, now closed, and the pick up coil of relay R656 to line 101, energizing said relay. Contacts R656a close, completing a circuit through the hold coil of relay R656 and continuously running cam contact CB24, which makes at 250° and breaks at 225°.

Contact R656b closes, completing a circuit from line 100 through continuously running cam contact CB27, which closes at 293°, to energize the card feed clutch magnet CFCM. This sets the card feed in operation at 330°, when the clutch engages, and cards begin to feed from the hopper. By holding the start key closed for several cycles the card feed will advance the first card to a point where it will operate card lever LCL at 220° and close the contact LCLC, causing card lever relay R223 to be energized through an obvious circuit. Contact R2a being closed at this time a hold circuit for relay R2 is completed through the card lever contact R223a to line 100. From this time on it is not necessary to hold down the start key to make the card feed run.

At 350° CB40 closes and remains closed until 220° in the next cycle, completing a circuit to the brush isolation relay R500, as follows: line 100, CB40, R223c, R656c, closed on card feed cycles, relay R500, to line 101. The contacts of R500 close and connect the brushes 20 with their plug hubs 19.

From 305° to 185° in each cycle CB39 is closed and completes a circuit through normally closed R648b, R609b, and relay R638 to line 101, energizing said relay. R638a closes, preparing a circuit to be completed from line 100 by CB55 at 320° through normally closed R648c, R638a, card cycles plug hub 51, plug wire 52, and relay 401 to line 101, energizing said relay, the points of this relay, such as R401a and b, transfer, preparing adding circuits to the related start magnets of accumulator 1.

Soon after the beginning of the next cycle the first card, which, in accordance with the example illustrated in Figs. 2 and 3, is punched with account number 29 in columns 1 and 2 (field 1), with 21 hours in columns 3 and 4 (field 2), and with the rate $ .85 in columns 5, 6 and 7 (field 3), begins to pass through the reading brushes of the lower brush station, with the 9's edge leading. The 9-hole in column 2 is sensed by a brush 20, completing a circuit from line 100 through CB1, 2, 3, 4, cam contacts CF9, 10, which are closed from 4° to 220° on every cycle in which the card feed operates, card lever relay contact R223b, common brush 21, contact roll 22, a brush 20, a point of relay R500, plug wire 23, print magnet PM2, to line 101, energizing said print magnet at the 9 index point time and stopping the related type bar in the 9 position. At 2 index point time the brush in column 1 senses a hole and print magnet PM1 is energized in the same way, to stop the related type bar in the 2 position.

At the same time a circuit is completed through a hole in column 3 and the related brush 20, a point of R500, plug wire 24, contact R401b in transferred position, normal contact R403b, normal contact R485b, start magnet STM1 of accumulator 1, to line 101. The start magnet is energized, causing the accumulator wheel clutch to be engaged. Rotation of the accumulator wheel continues until zero-time, when the mechanical knock-off disengages the clutch and stops the wheel, after it has turned two index positions.

The same 2-impulse through the brush in column 3 passes through a branch circuit extending from the transfer strap of contact R401b, wire 30, counter exit hub 31, plug wire 32, print magnet PM3, to line 101, energizing said print magnet and stopping the related type bar in the 2 position.

In column 4 the brush impulse at 1 time causes a 1 to be stored in the units wheel of accumulator 1 and operates the magnet PM4 to set the related type bar in the 1 position.

Meanwhile, the factor storage counters of the calculator have been reset to zero position, in preparation for receiving the new factors to be transferred from the card feed of the tabulating machine. One cycle point in advance of 9-time, namely, at 340° CB116 closes, completing an obvious circuit through relay R2273 and energizing said relay. Contacts 2273a close, completing a circuit from line 100 through CB106, now closed, R2273a, RP168d, and wire 57, to the left grid of factor storage counter reset trigger 60, switching this trigger to the left. A positive impulse from the right plate of trigger 60 passes through a coupling condenser 63, an inverter 61 and power tube 62, producing a rise at the plate of the power tube which is transmitted to the cancel bias line of the factor storage counters 65, 66, 67, and 68, resetting these counters. The trigger 60 is restored during the calculation time by means not shown in the drawing.

At 13° CB98 closes, preparing a circuit for impulses to read in values from the card feed to the factor storage counters. The pulses are timed by CB94 so that the first pulse occurs at 357° and 9 others follow one cycle point apart.

These pulses are transmitted from line 100 through CB's 94 and 98, wires 70 and 71, R168a, wire 72, to the left grid of the read-in pulse trigger 73. This trigger, which is normally switched to the right, is switched by the first pulse to the left, transmitting a negative pulse to inverter 74, thereby sending a positive pulse to grid No. 1 of each of the entry switches 75, 76, 77, 78.

One-half cycle point later in circuit is completed through CB's 87 and 90, wires 91 and 92, R168b, wire 93 to the right grid of the read-in pulse trigger 73. The trigger switches to the right and the positive pulse on its left terminal is inverted by tube 74 and transmitted as a negative voltage to grid No. 1 of each of the entry switches 75 to 78, terminating the first pulse. The pulses through CB's 87 and 90 restoring the read-in pulse trigger occur one-half cycle point after each pulse through CB's 94 and 97, so that together they have the effect of switching the read-in pulse trigger and producing pulses at mid-index point time to the read-in switches.

In the example given the first pulse has no effect, because the entry switches are cut off by the low potential on the number 2 grids, which are connected to the right plate terminal of respective entry triggers 80, 81, 82, and 83, which are normally switched to the right.

In column 5 the 8 hole of the first card is read by a circuit which extends from the brush hub 19 of column 5, through plug wire 84, wires 85, 86, and 87, to the left grid of entry trigger 83. The trigger switches to the left and the voltage on its right plate terminal rises, turning on the related entry switch 77. Thereafter, the impulses applied to grid No. 1 of this entry switch are transmitted as negative impulses to counter 67. 8 impulses will be transmitted to the counter in this way in this sequence. At 5-time a card impulse in column 6 switches the related entry trigger and admits 5 impulses through entry switch 77 to counter position 67.

The 8 and 5 card impulses in columns 5 and 6 are also transmitted through plug wires 88 and 89 to print magnets PM5 and PM6.

At 2-time the card impulse in column 3 is transmitted from counter exit hub 31a through plug wire 92, wires 93 and 94, wire 95, to entry trigger 81 and two impulses are consequently transmitted to counter position 66. Similarly, at 1-time a card impulse switches entry trigger 80 and one read-in impulse is entered in counter position 65.

At the end of the read-in portion of the cycle in which the first card is read, there have been stored in factor storage 1 the amount 21, and in factor storage 2 the amount 85 ($.85).

CB106 of the tabulator is identical in its calculator controlling functions to P46 of the punch described in the Palmer et al. application, Serial No. 38,078. As explained in said application, the opening of P46 at 13-time of the punch cycle operates a trigger to start calculation. In the same way, the opening of CB106 at 190° time of the tabulator cycle operates the same trigger of the calculator to start calculation. The circuit extends through CB106, wires 96 and 97, R168c, wires 98 and 99 to the Start Calculate means (not shown). In a manner described in the Palmer et al. application, Serial No. 38,078, the factors are read out of the factor storage counters at electronic speed into the multiplying circuits 110 and the result of the multiplication is stored in the result counters 111, 112, 113, 114 of the calculator.

In accordance with the example, the product of the hours and rate of the first card is to remain in the result counter of the calculator and the product of the hours and rate of the second card is to be added in that counter, producing the sum of the two products in the result counter of the calculator. Assuming that the calculation of the first product was completed within the calculation time of one cycle, as it would be for this simple problem, the card feed continues in operation and the second card is fed through the lower brush station. From this card the account number 29, the hours 19, and the rate $.95 will be printed in the same way as on the first card cycle and the hours 19 will be stored in counter 1 of the tabulator. The hours 19 and rate $.95 will be transmitted to the factor storage counters 1 and 2 of the calculator, as on the first card cycle, after these counters have been reset by operation of the reset trigger in the manner described. During the calculation time of the second card cycle the product of 19 times $.95 equals $18.05 will be computed and added into the result counter of the calculator, making a total of $35.90.

Meanwhile, early in the second card feed cycle the brush in column 8 read a 9 hole, signaling a summary punch operation to follow in the next cycle and preparing the total program circuits of the tabulator. The 9 impulse signaling a summary punch cycle passes from the brush in column 8 through a contact of relay R500, plug wire 115, common hub 116 of a digit selector, brush 117, 9 hub of the digit selector, plug wire 118, normally closed point R88b, the pick up coil of relay R877 to line 101, energizing said relay. Contact R877a closes, completing a holding circuit through CB42 to line wire 100. Contact R877b closes, completing a circuit through CB31 and the pick up coil of R494. Contact R494a completes a circuit for the holding coil of R494 through normally closed R88c to line wire 100. The circuit through R494a extends through wire 119, connector 14, wire 120, and relay R176, to line 101, energizing said relay. Contact R176a closes, preparing a circuit which is completed by CB69 at 282°, to start the punch. This circuit extends from line 100 in the punch, through punch stop key contact PSP, normally closed contact R174b, contact R176a, connector 16, contact R494c, normally closed contact R88d, cam contacts CB69, connector 15, and relay RP3, to line 101, energizing said relay. Contact RP3a closes completing a holding circuit for relay RP3 through cam contact P30, contact RP3b closes, preparing a circuit which is completed through cam P31, closed at latch time of the punch cycle, through RP3b and the punch clutch magnet PCL to line 101, energizing said magnet and starting the punch.

The 9 impulse from column 8 was also transmitted from the 9 hub of the digit selector through plug wire 121 to the pick up coil of relay R601 and line 101, energizing said relay. R601a point closes extending a holding circuit through CB50 to line 100. R601b closes, preparing a circuit which is completed at 225° from CB52 through the pick up coil of total relay R609. Contact R609a closes, extending two holding circuits from relay R609 through CB's 51 and 32. CB51 is shunted by a point of program stop relay R623, which is not energized until the total cycle is completed. Relay R609 will therefore not drop out until that time.

R609c contacts transfer, but contacts R494c open before CB21 closes at 282° and the circuit is not completed at this time through R609c to relay R659. Also, the circuit to R656 from CB21 is broken and this relay drops out when CB24 opens at 225° in the cycle during which the 9 hole summary punch signal was read.

With R656b open the impulse from CB27 does not get through to the card feed clutch magnet CFCM and the card feed latches up at 330°.

With relays R659 and R656 both down and contacts R659d and R656d closed an impulse from CB26 at 293° picks up idle cycles relay R648. Then a contact of this relay extends a holding circuit through CB25, to last through most of the next cycle. R648b and R648c open, preventing relays R638 and R635 from being energized during the next cycle, causing the accumulator circuits of the tabulating machine to remain idle. R648d shunts CB32, preventing relay R609 from being dropped out.

The tabulator circuits are now prepared to remain idle during the summary punch cycle and are set up to start the total cycle at the end of the summary punch cycle. The result counter of the calculator now has stored in it the value 3580 ($35.80). Due to the operation of the electronic calculator, as described in the Palmer et al. application, Serial No. 38,078, this value is stored as the 9's complement of 3580, or 6419. Only the connections from the hundreds and thousands orders (113 and 114) of the result counter to the tabulator and punch circuits are shown. The connections of the units and tens orders are similar.

The total is read out of the result counter to the punch by feeding 10 impulses to each of its counter positions and utilizing the carry impulses which occur when each counter position passes from 9 to zero to operate the punch magnets. The number of pulses required to advance a counter position from its digital value to the zero position is equal to the number stored in the counter position. Since the cards in the punch are feeding in the direction of 0, 1, 2 . . . 9, and the read out impulses originating in the punch coincide with the arrival of the successive index point positions of the card at the punch station, the output impulse from each counter position will cause the corresponding punch magnet to operate at the right time to punch the index point position corresponding to the value which was stored in the counter position. The manner in which this occurs will now be described in detail.

As soon as the punch starts to run the cam contact P36 opens, dropping out relays R168 and R107. Points of the former relay couple the cam contacts of the punch to the calculator control circuits, while points of the latter connect the punch magnets to the counter read out circuits of the calculator.

The read out of the result counter is initiated by an impulse from cam P46 of the punch transmitted through a card cycles hub 135, plug wire 136, counter read out hub 137, wire 138, R168j point in normal position, wires 138a and 139 to the right grid terminal of counter read-out trigger 140, switching this trigger to the right. A voltage rise on the left plate terminal of the trigger 140 renders conductive the right half of a tube 141, the plate terminals of which are connected together. A negative output from these terminals is transmitted through an inverter 142 as a voltage rise on the No. 2 grids of roll out switches 143, 144, 145 and 146, rendering these switches in condition to transmit cam impulses from the summary punch.

Cam contact P1 closes on the line at successive index point times. Cam contact P3 closes just before zero time of the punch cycle, so that the impulse transmitted by cam P1 at zero time passes through wire 147, normal RP168b, wires 148 and 149 to the left grid of read out pulse trigger 150. This trigger switches left and the resulting negative impulse at its left plate terminal is inverted by tube 151 and transmitted as a positive impulse to the No. 1 grids of the read out switches 143 to 146. Negative impulses are transmitted from these switches to the respective counter positions of the result counter, advancing each counter position one unit toward the output condition. Since this counter has stored in it the number 6419, there is an immediate output from the units counter position, but since the connections are not shown for this counter position the effect of the output will be explained with reference to the hundreds and thousands position.

At 0.5 after zero time of the punch cycle, cam contact P9 closes and an impulse is transmitted through cam contact P13, which closed shortly before, through wire 155, RP168a, wires 72 and 157, to the right grid of trigger 150, switching this trigger to the right. The resulting rise of potential on the left plate terminal is inverted by tube 151 and the negative output of this tube cuts off the switch tubes 143 to 146, terminating the cam impulse for zero-time.

Two more impulses are transmitted through read-out trigger 150 to the result counter positions and on the third impulse the thousands counter position is moved from 9 to 0. The resulting output impulse is transmitted through intermediate circuits described in the Palmer et al. application, Serial No. 38,078, as a positive impulse to the grid of thyratron 159. This coincides with application of +50 volts to the plates of the thyratrons through P50, wire 169, RP168g, and wires 232 and 233. A circuit is thereby extended through the thyratron 159, wires 160 and 161, plug hub 162, plug wire 163, normal contact R107a, to the thousands order punch magnet PC1 and line 101, energizing said magnet and causing a hole to be punched in the 3-index point position of column 76 of the card check (Fig. 6).

After two more cam impulses transmitted to the result counter positions there is an output from the hundreds order counter, which causes thyratron 158 to be ignited, completing a circuit to the related punch magnet, so that a hole is punched in the 5 index point position of column 77. Through the circuits not shown, columns 3 and 4 are punched in the 8 and the zero index point positions.

Returning to the summary punch control circuits, as soon as RP3 was energized to initiate a summary punch cycle, a circuit was completed from line 100 through P48, R176b, R3c, and relay 174 to line 101, energizing said relay. R174a extends a holding circuit for R174 through R176b and P48. R174b opens to disable the pick up circuit for RP3, so that the summary punch will not execute more than one cycle.

At 6.2 of the summary punch cycle P21 completes a circuit from line 101 through wire 200, P21, wire 201, and the pick up coil of relay R88 to line 101, energizing said relay. Contacts R88a extend a holding circuit through CB32 to line 100. Contact R88b opens to further disable the pick up circuit of the summary punch clutch control relay RP3. R88c opens to drop out the summary punch control relay R494.

R494c closes and at 282° CB21 closes, completing a circuit through print clutch control relay R659. R659a closes, extending holding circuit for this relay through CB24. R659b closes extending a circuit at 293° through CB97, R659b, and magnet PCM to line 101, energizing said magnet and starting a total cycle. R659d breaks the pick up circuit of R648, which drops out immediately, allowing R635 to be energized through normal R648e and CB39 at 305°. R635a closes, completing a circuit through CB55 at 320°, R635a, R609b, plug wire 125, and relay R403 to line 101; also through plug wire 126 and R755 to line 101, energizing said relays. R403 is a total relay which prepares total circuits for accumulator 1, while R755 is a plus relay for accumulator 2 and prepares the circuits to the start magnets of this accumulator.

Also at 320° CB63 closes extending a circuit from line 100 through R609d and R648f, CB63, and program stop relay R633 to line 101, energizing said relay. Contact R633a closes, extending a holding circuit through CB38 to line 100. R633b opens, preparing the holding circuit of R609 to be broken when CB51 opens at 220° in the following cycle.

When P36 made at 13.4 at the end of the summary punch cycle relays R168 and R107 were picked up, transferring control of the calculator timing from the punch to the tabulator and opening the circuits to the punch magnets.

The read out of the result counter of the calculator into the punch was done without resetting the counter. That is to say, each counter position received 10 impulses and was restored thereby to its original condition. At the end of the summary punch cycle the total remains in the result counter awaiting read out into the tabulator. This read out necessarily uses the inversion circuit described in the aforesaid Palmer et al. application, Serial No. 38,078, in order to reconcile the output pulse timing from the result counter with the index point timing of the tabulator, which progresses in descending order. This inversion circuit operates on the following principle:

At 0.5 before 9 index time 9 high speed impulses are added to each order of the counter. At 9 index time the cam impulse adds one more, making a total of 10 impulses. If in one counter position the complement of a 9 is stored, namely, zero, the counter position will be rolled from zero to 9 by the 9 high speed impulses and from 9 to zero by the cam impulse. The resulting output impulse occurring at 9 index time of the tabulator can be used to accumulate a 9, or to print a 9.

On the next mid-index point position 8 high speed impulses are given to each counter position and at 8 index point time a cam impulse raises the total to 9. If a counter position had been standing at 1, the 9's complement of 8, the 9th impulse at 8 index time would cause it to change from 9 to zero and produce an output impulse for accumulation or printing control.

At each further mid-index point time 8 high speed impulses are given to each counter position and the cam impulse at index time makes the ninth pulse. When the cam impulse makes a counter position pass from 9 to 0 an output from the related thyratron will occur, but if a counter position passes from 9 to 0 on a high speed impulse there will be no output from the thyratron, because the anode circuit to the thyratrons is cam controlled so as to be completed only at index time.

The circuits whereby the total is read out with inversion, in the manner just described, are fully disclosed in the same Palmer et al. application, Serial No. 38,078, and will only be briefly outlined herein. When R168 was energized a circuit was completed from line 100 in the tabulator through CB10, plug hub 210, plug wire 211, counter read out and reset plug hub 212, wire 213, RP168h, wires 214 and 215, to the right grid of counter read out and reset control trigger 216. This trigger switches to the right, sending a positive impulse to the left side of double inverter 141 and depressing the voltage on the plate terminal of this inverter. This condition is inverted by tube 142 and plus voltage established on the number two grids of read out switches 143 to 146.

With R168 energized mid-index pulses are transmitted from line 100 in the tabulator through CB's 94 and 96, wires 70, 71, and 170, RP168f, wires 171 and 172, to the left grid of high speed impulse trigger 173, switching this trigger to the left and thereby raising the potential on grid No. 2 of inversion pulse switch 174. A source of pulses 175 tranmits positive impulses through wire 176 to the No. 1 grid of switch 174. Negative impulses from this switch are transmitted through wire 177 to the four counter positions 111 to 114. The same source of pulses 175 transmits pulses through inverter 178 to a three-stage binary electronic counter 179. This counter produces an output impulse at every 8th input impulse, which is transmitted through an inverter 180 to the right grid of trigger 173. This trigger will accordingly shut off the switch 174 after every 8th impulse. A special delay circuit disclosed in the Palmer et al. application, Serial No. 38,078, but not in the present drawing, adds a ninth impulse to the first group. The high speed pulses are cut off until the next mid-index pulse from CB94 turns the trigger 173 on again.

Meanwhile an index pulse is transmitted from line 100 of the tabulator at 9 index time through CB87 and CB89, through wires 180 and 181, RP168e, wires 148 and 149, to the left grid of trigger 150. This trigger switches to the left and its negative impulse is inverted by tube 151 and applied to the number 1 grids of switch tubes 143 to 146. There is no output from any counter position at the 9 index time.

At the next mid-index time trigger 173 is again switched left by an impulse from CB94 and 8 more high speed impulses are transmitted through switch 174 to the result counter positions 111 to 114. A ninth impulse transmitted at 8 index time from CB87 moves counter position 112 from 9 to zero. This causes an output impulse which coincides with the application of plus 50 volts to the plates of the thyratrons 156 to 159, through CB111, wires 230 and 231, RP168g, and wires 232 and 233. A circuit is completed, therefore, through thyratron 157 to the accumulator and print magnets of the tabulator, but this circuit is not shown in the drawing. The corresponding circuit of a different order will be traced presently. At the third index impulse following from CB87, the counter position 113 is moved from 9 to zero and plus voltage is applied to the grid of the related thyratron 158, igniting the thyratron and completing a circuit through wires 235, 236 and 237, plug wire 238, transferred R755a, normal R761a and R485c, to start magnet STM4. This impulse occurring at the 5 index point time of the tabulator cycle causes a 5 to be added in the hundreds order of accumulator 2. The same impulse is transmitted through counter exit hub 239 to print magnet PM9, setting up the related type bar at the 5 position.

In a similar manner the start magnet STM3 and print magnet PM8 are energized at 3 index point time, causing a 3 to be added in the thousands order of accumulator 2 and to be set up on the corresponding type bar.

In the same machine cycle the amount stored in accumulator 1, namely, 40, is read out of this accumulator into the print magnets PM3 and PM4. With total relay R403 energized an impulse is transmitted from CB14 at 348° of the cycle preceding the total read out cycle, through transferred R403a and R403b and normal R485a and R485b to start magnets STM1 and STM2, setting the accumulator wheels in rotation. At 4 index point time the counter wheel of the tens order of accumulator 1 moves the 9, 10 brush 35 into engagement with the 10 contact 34 and an impulse occurring at that time from CB10 is transmitted through wire 33, contacts 34 and 35, transferred R403d, counter exit hub 31, plug wire 3 and print magnet PM3 to line 101, energizing the print magnet and setting up a 4 on the type bar.

The type bar pertaining to PM4 is arrested at zero position in the manner conventional in this type of tabulating machine.

In the total cycle just described 40 is printed in the hours field of the report and 3580 ($35.80) is printed in the earnings field of the report.

The calculator was set in operation for a read out and reset cycle. The re-setting is accomplished as follows:

The positive impulse from read-out and reset control trigger 216 which turned on the read-out switches 143 to 146, was also transmitted as a negative impulse by inverter 217 to the right grid of counter reset trigger 218. The trigger 218 was switched on and the negative condition at its left plate terminal lowered the voltage on the right half of double inverter 219. However, the left half of this inverter was maintained in a conductive condition through the counter read-out period, under an electronic control derived from CB106. These circuits are shown in the aforesaid Palmer et al. application, Serial No. 38,078, but not in the present drawing. Immediately after CB106 opens and starts calculation, a negative impulse derived from the electronic timer circuit is applied to the left grid of double inverter 219, causing a positive impulse to be transmitted from its plate terminals through wire 220 and condenser 221 to the cancel bias line of the counter circuits 111 to 114. This positive impulse resets all of the counter circuits 111 to 114 to the 9 position, which is the complemental zero condition.

At 220° of the total cycle relay R609 was dropped out, as previously explained. As a result, contact R609c transfers to normal position and an impulse from CB21 at 282° again energizes the card feed control relay R656. The next cycle is a card feed cycle in which the first card of account number 28 is read in the same manner as previously explained.

The invention has been described by reference to a preferred embodiment and illustrated by a particular problem. In this embodiment the tabulating machine may be thought of as a main master machine and the summary punch as an auxiliary master machine, since the tabulator programs the operation of all of the machines, while the punch controls the switching of the timing means in response to a signal from the tabulator. Other arrangements of the switching control may be substituted for the illustrative one shown.

The inherent flexibility of the individual units, offers wide opportunity for variation of the combined operation of the machines. For example, the calculator can be made to perform division and cross-footing operations under the same type of controls as those illustrated in the drawing. Also, the tabulating machine as disclosed is inherently capable of varying the operation by reading out of its own accumulators to the calculator, as well as from the card brushes, and this can be accomplished under control of card impulses through selectors, as is well understood by those skilled in the art.

What is claimed is:

1. In record controlled apparatus, a slave machine, two master machines, each having individual driving means, each master machine including timing control means for said slave machine, means to transfer data between said slave machine and either of said master machines, record reading means in one of said master machines, and means controlled by records read by said record reading means for selectively coupling the data transfer means and timing control means of one of said master machines, or the data transfer means and timing control means of the other one of said master machines, to said slave machine.

2. In apparatus of the class described, a machine for performing calculations including multiplication, means to store results of said calculations, and means to read out the results from said storage means; a recording machine including driving means, record reading means, means to time the operation of said read out means, and recording control means adapted to respond to the read out of said storage means, a second recording machine including driving means, means to time the operation of said read out means, and recording control means adapted to respond to the readout of said storage means, and means controlled by records read by said reading means for selectively coupling either the recording control means and timing control means of said first recording machine, or the recording control means and timing control means of said second recording machine, to said calculating machine.

3. In apparatus of the class described, an electrical calculating machine for performing calculations including multiplication, two recording machines each including electrical timing control means for said calculating machine and recording control means, one of said recording machines including record reading means, timing input means connected to said calculating machine, means controlled by records at said record reading means for selectively causing an operation of one of the other of said recording machines under control of said calculating machine, and means to switch said input means to the timing control means of whichever recording machine is set in operation.

4. In an apparatus of the class described, an electrical calculating machine for performing calculations including multiplication, a first recording machine including record reading means, a second recording machine, each of said recording machines including an individual driving means, duplicated electrical timing control means for said calculating machine in each of said recording machines, connections for coupling said electrical timing means to said calculating machine, including means to switch the timing control means of either of said recording machines to said calculating machine alternatively, and means controlled by records read by said record reading means for controlling said switching means.

5. In apparatus of the class described, a cylically operating tabulating machine including record reading means, accumulating means, printing means, means to control said accumulating means from said record reading means, and means to control said printing means from said record reading means or said accumulating means; a cyclically operating punch including means to feed records, means to punch a plurality of columns of the records in one machine cycle, and means to control said punching means; a calculating machine including means to store factors for calculation, means for performing calculations with said factors including multiplication thereof, and means to store the results of said calculations; means for transmitting factors from said record reading means to said factor storage means, means for transmitting results from said result storage means to the control means of said punching means, means for transmitting results from said result storage means to the control means of said accumulating means and to the control means of said printing means, said transmitting means including timing means in said tabulating machine and timing means in said punch and switching means controlled by records in said record reading means for rendering the timing means in said tabulating machine and the timing means in said punch alternatively effective.

6. In record controlled apparatus of the class described, a slave machine, two master machines each having independent non-synchronized driving means, timing control means for said slave machine in each of said master machines, record reading means in one of said master machines, and means controlled by records in said record reading means for switching the timing control of said slave machine from one of said master machines to the other.

7. In record controlled apparatus of the class described a slave machine, a main master machine, an auxiliary master machine, timing control means for said slave machine in each of said master machines, means normally latching said auxiliary master machine in an idle condition, record reading means in said main master machine, means responsive to a signal in a record read by said reading means for starting an operation of said auxiliary master machine, means connecting the timing means of said main master machine to said slave machine when said auxiliary master machine when in operation to disconnect the timing means of said main master machine from said slave machine and to connect the timing means of said auxiliary master machine to said slave machine.

JONAS E. DAYGER.
ORVILLE B. SHAFER.
ALVIN E. GRAY.

REFERENCES CITED

The following references are of record in the file of this patent:

UNITED STATES PATENTS

| Number | Name | Date |
|---|---|---|
| 2,062,118 | Bryce et al. | Nov. 24, 1936 |
| 2,434,500 | Leathers et al. | Jan. 13, 1948 |

Certificate of Correction

Patent No. 2,573,312 — October 30, 1951

JONAS E. DAYGER ET AL.

It is hereby certified that error appears in the printed specification of the above numbered patent requiring correction as follows:

Column 16, line 68, for "one of" read *one or*; column 18, line 25, after "machine" insert *is idle, and means controlled by said auxiliary master machine*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*